United States Patent [19]

Miyamae et al.

[11] Patent Number: 5,546,600
[45] Date of Patent: Aug. 13, 1996

[54] DATA DRIVEN COMPUTER PRODUCING INHIBIT SIGNAL FOR INHIBITING MERGING EXTERNAL PROVIDED DATA PIECES WITH INTERNAL DATA PIECES WHEN NUMBER OF PROCESSING DATA EXCEEDS REFERENCE VALUE

[75] Inventors: Futoshi Miyamae, Tenri; Souichi Miyata, Nara, both of Japan

[73] Assignee: Sharp Kabushiki Kaisha, Osaka-fu, Japan

[21] Appl. No.: 990,247

[22] Filed: Dec. 14, 1992

[30] Foreign Application Priority Data

Dec. 16, 1991 [JP] Japan ................................ 3-331955

[51] Int. Cl.⁶ .................................................. G06F 15/82
[52] U.S. Cl. ...................... 395/800; 395/250; 395/375; 364/232.22; 364/281.3; 364/259.2; 364/DIG. 1
[58] Field of Search ................................ 395/200, 250, 395/275, 425, 725, 375, 800

[56] References Cited

U.S. PATENT DOCUMENTS

| | | | |
|---|---|---|---|
| 4,633,489 | 12/1986 | Morishita | 370/91 |
| 4,663,706 | 5/1987 | Allen et al. | 395/200.13 |
| 4,799,215 | 1/1989 | Suzuki | 370/60 |
| 4,985,890 | 1/1991 | Matsumoto et al. | 370/94.1 |
| 4,998,198 | 3/1991 | Chen | 395/352 |
| 5,163,144 | 11/1992 | Ikeno | 395/479 |
| 5,179,661 | 1/1993 | Copeland et al. | 395/250 |
| 5,187,707 | 2/1993 | Chu et al. | 370/79 |
| 5,197,129 | 3/1993 | Kayama et al. | 395/868 |
| 5,226,012 | 7/1993 | Amano et al. | 365/189.05 |
| 5,249,271 | 9/1993 | Hopkinson et al. | 395/250 |
| 5,278,956 | 1/1994 | Thomsen et al. | 395/250 |
| 5,313,600 | 5/1994 | Kasai | 395/375 |
| 5,369,775 | 11/1994 | Yamasaki et al. | 395/250 |

FOREIGN PATENT DOCUMENTS

| | | |
|---|---|---|
| 77645 | 11/1987 | Japan . |
| 186297 | 2/1988 | Japan . |
| 4121891 | 4/1992 | Japan . |

*Primary Examiner*—Thomas C. Lee
*Assistant Examiner*—Moustafa M. Meky

[57] ABSTRACT

In a data-flow type computer using paired data, the improvement of a data transmission apparatus wherein the difference in the number of data pieces written in a memory and the number of data pieces read out from the memory is determined. If this difference exceeds a predetermined number, a transmission inhibiting signal is generated from an inhibiting signal generating portion to be applied to a merging portion, wherein the merging portion temporarily inhibits the merging of data from an external data memory or external information processing unit and then allows for the merging of data when the difference becomes less than the predetermined number.

10 Claims, 5 Drawing Sheets

DATA DRIVEN COMPUTER PRODUCING INHIBIT SIGNAL FOR INHIBITING MERGING EXTERNAL PROVIDED DATA PIECES WITH INTERNAL DATA PIECES WHEN NUMBER OF PROCESSING DATA EXCEEDS REFERENCE VALUE

BACKGROUND OF THE INVENTION

1. Field of the Invention

The present invention generally relates to data transmission apparatuses. More particularly, the present invention relates to a data transmission apparatus which inhibits data transmission in case of overflow of data when data is transmitted autonomously and asynchronously from the first unit to the second unit.

2. Description of the Background Art

A data transmission apparatus which autonomously and asynchronously transmits data from the first data path to the second data path is disclosed, for example, in U.S. Pat. No. 4,985,890. When a transmission permitting signal is transmitted from the second data path to the first data path, data is transmitted from the first data path to the second data path, while the first data path transmits the transmission prohibiting signal to a preceding stage until the data transmission from the first data path to the second data path is completed. After the data transmission from the first data path to the second data path, the first data path provides the transmission permitting signal to the preceding stage to hold new data transmitted from the preceding stage.

In the data transmission device described above, at the time of data transmission from the first data transmission path to the second data transmission path, if a propagation delay time in the second data transmission path is longer than that in the first data transmission path, continuous increase in the number of data pieces accepted in the second data transmission path in proportion to an length of running time leads to the excess number of data pieces, resulting in decrease in processing speed and overflow depending on the contents of processing.

SUMMARY OF THE INVENTION

Therefore, a primary object of the present invention is to provide a data transmission apparatus capable of inhibiting data transmission from the first unit responsive to an excessive number of data pieces accepted in the second unit.

Briefly, an object of the present invention is to provide a data transmission apparatus transmitting data from the first unit to the second unit in which the second unit includes a transmission inhibiting signal transmitting circuit which detects the number of internal data pieces to transmit a transmission inhibiting signal to the first unit responsive to the number of said data pieces therein exceeding a predetermined number, and the first unit includes an inhibiting circuit which inhibits data transmission from the first unit to the second unit in response to the transmission inhibiting signal provided from the second unit.

According to the present invention, the number of data pieces stored in the second unit can be controlled to enhance the processing speed and prevent a system-down due to an excessive number of data pieces, resulting in the construction of a safety system.

In a preferred embodiment of the present invention, the first unit includes a merging circuit merging externally and internally applied data and providing the merged output, and the second unit includes a program storage circuit, a paired data detecting circuit, an arithmetic processing circuit and an internal data buffer circuit. The program storing circuit stores programs in advance and reads out the corresponding program data and provides it to the paired data detecting circuit in response to data applied from the merging circuit, the paired data detecting circuit detects paired program data from the read program data, and then arithmetic processing is performed by the arithmetic processing circuit on the basis of detected program data. In the internal data buffer circuit including the transmission inhibiting signal transmitting circuit, data processed by the arithmetic processing circuit is stored in the storage circuit, and the transmission inhibiting signal generated by the transmission inhibiting signal generating circuit is applied to the merging circuit.

Therefore, according to the preferred embodiments of the present invention, system down-time is prevented by inhibiting the merge of the external data by the merging circuit in case of overflow of internal data.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
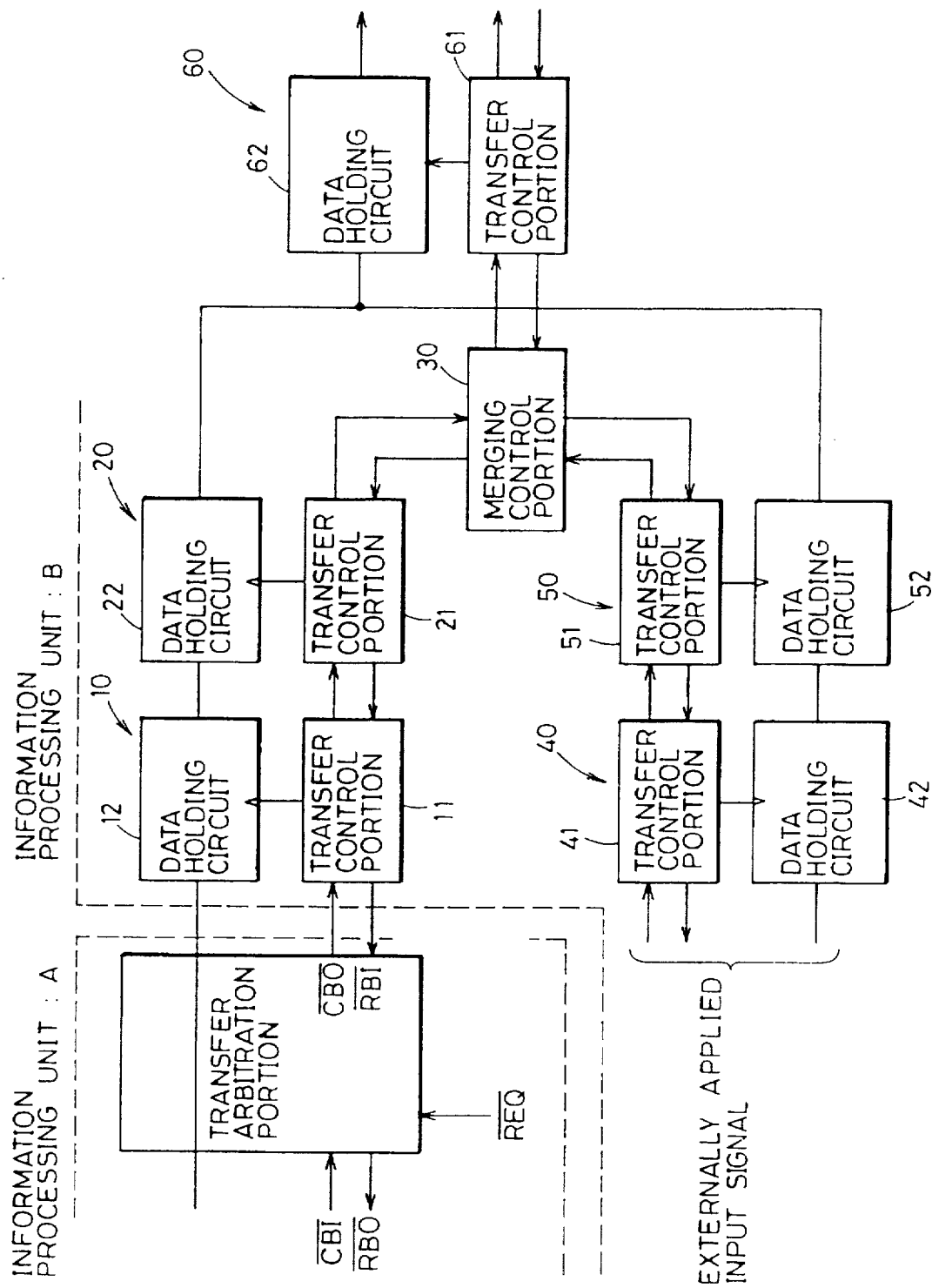
FIG. 1 is a block diagram showing one embodiment of the present invention.

FIG. 1 is a schematic block diagram showing one embodiment of the present invention. Referring to FIG. 1, in this embodiment, data is transmitted from an information processing unit A to an information processing unit B. The information processing unit A includes a transfer arbitration portion 1. Transfer arbitration portion 1 arbitrates the transmission of data applied by an $\overline{REQ}$ signal from the preceding stage to the succeeding stage. When the $\overline{REQ}$ signal is in a permitting state, data is applied to a data transmission path 10 included in the information processing unit B. Data transmission path 10 is provided with a transfer control portion 11 and a data holding circuit 12. When a transmission permitting signal is applied from a data transmission path 20 in the succeeding stage, the transfer control portion 11 transmits the held data to data transmission path 20. When data transfer is completed, the transmission permitting signal is applied to the data transmission path in the preceding stage. Data transmission path 20, similarly to the data transmission path 10, includes a transfer control portion 21 and a data holding circuit 22.

In a merging control portion 30, data held in data transmission path 20 and data held in a data transmission path 50 are selectively transmitted to a data transmission path 60. Each of data transmission paths 40, 50 and 60 includes transfer control portions 41, 51, 61 and data holding circuits 42, 52 and 62, respectively. Also, in the merging control portion 30, the transmission permitting signal is applied to transfer control portion 21 when data held in data transmission path 20 is transmitted to data transmission path 60, and the transmission permitting signal is applied to transfer control portion 51 when data held in data transmission path 50 is transmitted to data transmission path 60.

Figure 2:
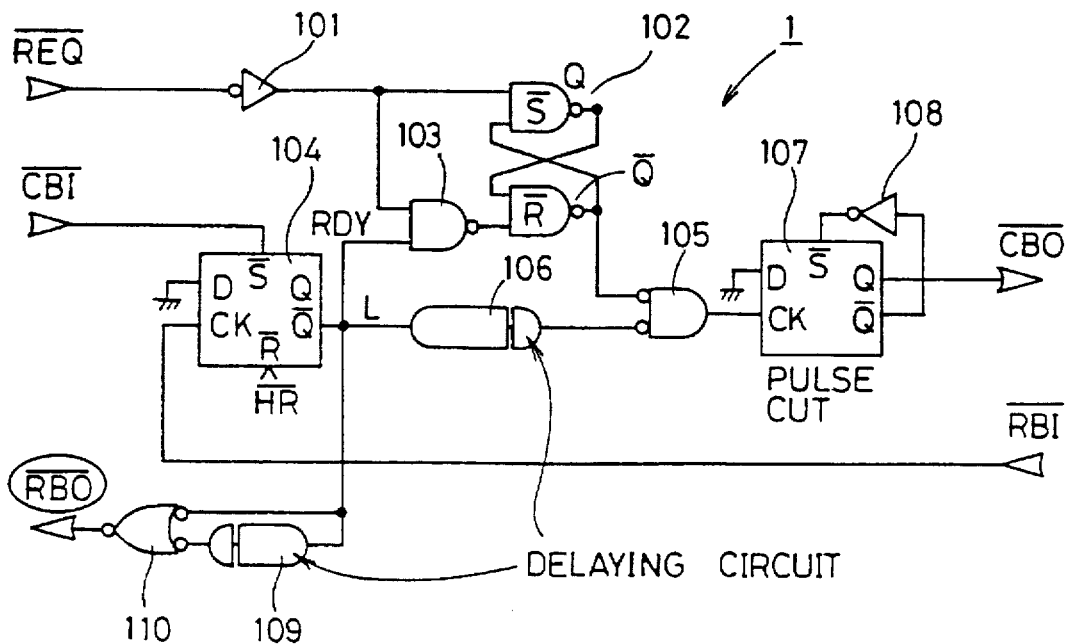
FIG. 2 is a block diagram showing the main part of a transfer arbitration portion of FIG. 1.

FIG. 2 is a block diagram showing a main part of the transfer arbitration portion of FIG. 1. Referring to FIG. 2, when the $\overline{REQ}$ signal is at a logic high or an "H" level, this $\overline{REQ}$ signal is inverted to a logic low or an "L" level by an inverter 101 and applied to one input end of an NAND latch 102 so that output Q is set to an "L" level, while being applied to the other input end of an NAND gate 103 to close this gate. A $\overline{Q}$ output of NAND latch 102 is applied to one input end of an NOR gate 105. When $\overline{CBI}$ signal of "L" level is applied to a set input end of an RS flipflop 104, a $\overline{Q}$ of RS flipflop 104 attains an "L" level, delayed by a delaying circuit 106 and applied to the other input end of NOR gate 105. Subsequently, NOR gate 105 applies a signal of "H" level to a clock input end of a D type flipflop 107 for cutting pulse. A $\overline{Q}$ output of D type flipflop 107 is applied to an $\overline{S}$ input end through an inverter 108. D type flipflop 107 is set in response to the signal of "H" level of the output of NOR gate 105 to provide $\overline{CBO}$ signal of "L" level from its Q output, leading to data transmission. The $\overline{Q}$ output of RS flipflop 104 is applied to one input end of an OR gate 110, while being applied to the other input end thereof with the delay through a delaying circuit 109, consequently, an $\overline{RBO}$ signal of "L" level is provided from the output of OR gate 110 to inhibit data transmission from the preceding stage.

When the $\overline{REQ}$ signal attains an "L" level, the $\overline{Q}$ output of NAND latch 102 attains an "H" level to close NOR gate 105. As a result, even if the $\overline{CBI}$ signal of "L" level is applied to set RS flipflop 104 with the signal of "L" level being provided from its $\overline{Q}$ output, D type flipflop 107 cannot be set because of the closure of NOR gate 105 to inhibit data transmission.

Next, when a transmission permitting signal $\overline{RBI}$ of "H" level is applied from the succeeding stage, the $\overline{Q}$ output of RS flipflop 104 attains an "H" level to bring the transmission permitting signal $\overline{RBO}$ for the preceding stage to an "H" level, resulting in the permission of data transmission from the preceding stage.

Figure 3:
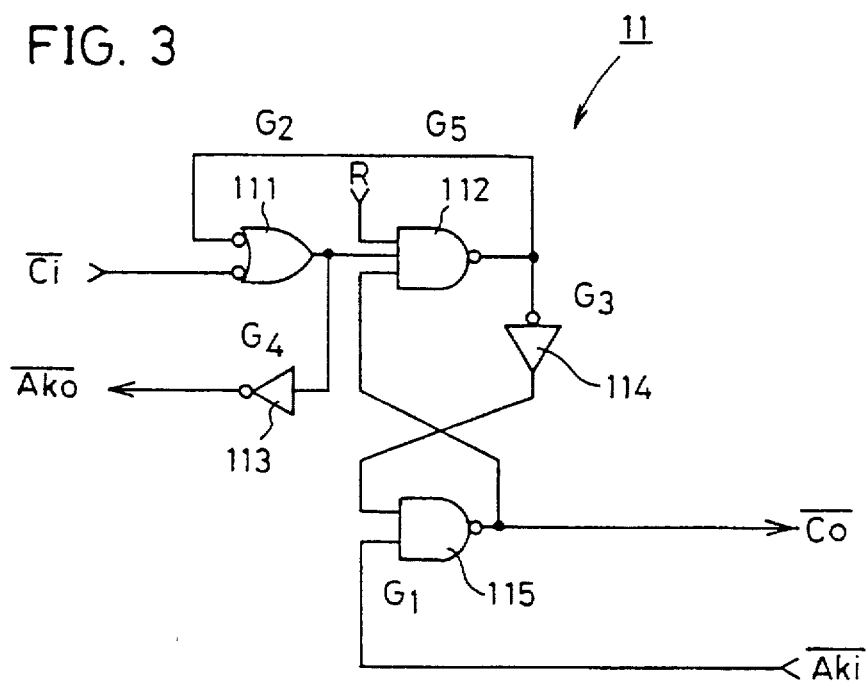
FIG. 3 is a block diagram showing a transfer control portion of FIG. 1.
Figure 4:
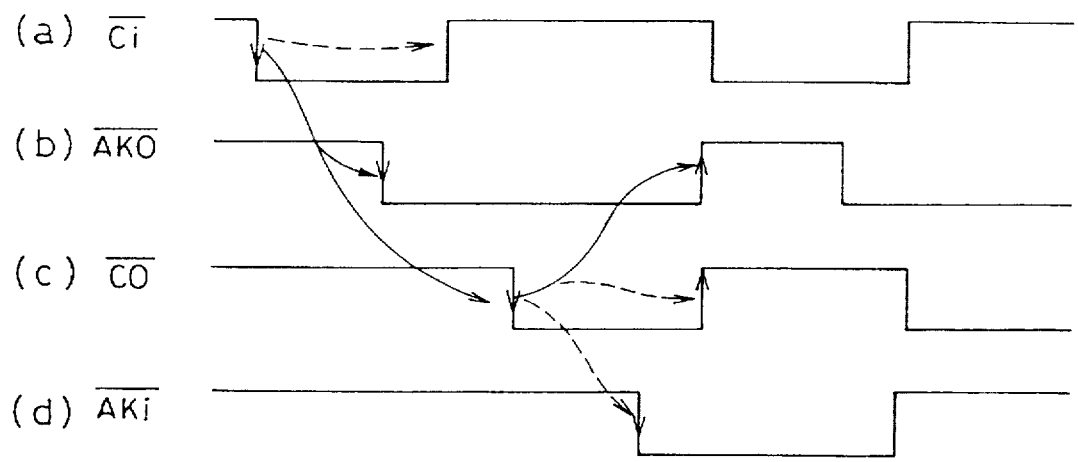
FIG. 4 is a timing chart showing an operation of the transfer control portion when the data transmission path is available.
Figure 5:
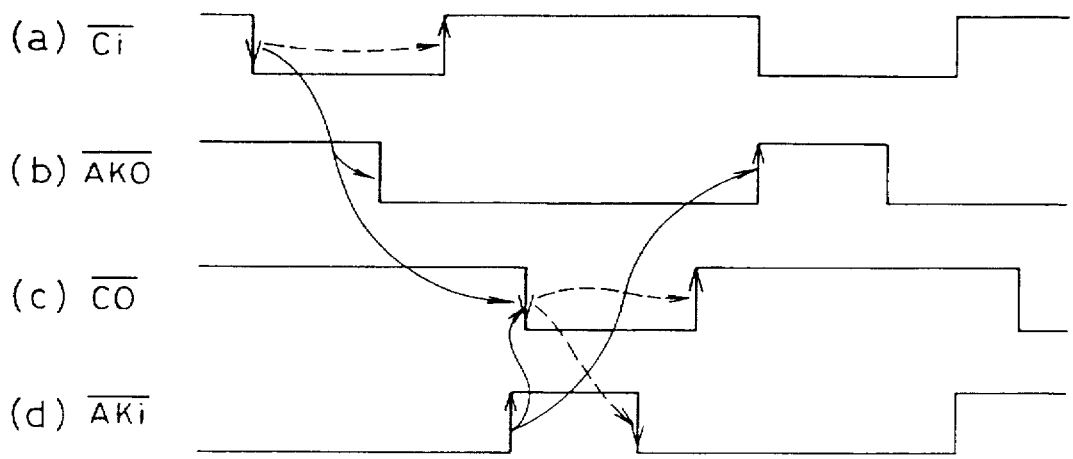
FIG. 5 is a timing chart showing an operation of the transfer control portion when the data transmission path is busy.

FIG. 3 is a block diagram showing the transfer control portion of FIG. 1, and FIGS. 4 and 5 are timing charts showing operations of the transfer control portions.

Transfer control portion 11 will now be described with reference to FIGS. 3 to 5. As shown in FIG. 3, transfer control portion 11 includes 2-input NAND gates 111, 115, 3-input NAND gate 112 and inverters 113 and 114. A transmission signal C10 is applied to a transmission signal input terminal $\overline{Ci}$ from the preceding stage portion and a transmission permitting signal Ak10 is provided from a transmission permitting signal output terminal $\overline{Ako}$. A transmission signal C20 is provided from a transmission signal output terminal $\overline{Co}$, and a transmission permitting signal AK20 is applied from transfer control portion 21 in the succeeding stage (see FIG. 1) to a transmission permitting signal input terminal $\overline{Aki}$.

Now, operation in the case where the data transmission path in the succeeding stage is available will be described with reference to FIG. 4. When the data transmission path in the succeeding stage is available, the transmission permitting signal AK20 of "H" level is applied from the transfer control portion in the succeeding stage. Therefore, the transmission permitting signal input terminal $\overline{Aki}$ is at an "H" level. When the transmission signal C10 applied from the preceding stage portion falls to an "L" level, the transmission signal input terminal $\overline{Ci}$ changes to an "L" level, whereby the output of NAND gate 111 attains an "H" level. As a result, the output of inverter 113 attains an "L" level and the transmission permitting signal AK10 provided from the transmission permitting signal output terminal $\overline{Ako}$ falls to an "L" level, while the output of NAND gate 112 attains an "L" level and the output of inverter 114 attains an "H" level. In this case, the transmission permitting signal input terminal $\overline{Aki}$ is at an "H" level, whereby the output of NAND gate 115 falls to an "L" level. Consequently, the transmission signal C20 provided from the transmission signal output terminal $\overline{Co}$ falls to an "L" level.

In transfer control portion 21 in the succeeding stage receiving the transmission signal C20 shown in FIG. 1, the transmission permitting signal AK20 applied to transfer control portion 11 falls to an "L" level in response to the fall of the transmission signal C20, whereby the transmission permitting signal input terminal $\overline{Aki}$ of transfer control portion 11 falls to an "L" level. The output of NAND gate 112 attains an "H" level in response to the fall of the input of NAND gate 115 to an "L" level, whereby the output of inverter 114 attains an "L" level. The output of NAND gate 115 again rises to an "H" level, whereby the transmission signal C20 again rises to an "H" level. As described above, the transmission signal C20 rises to an "H" level after a predetermined period of time after the fall to an "L" level.

The transmission signal C10 applied from the preceding stage portion rises to an "H" level after a predetermined period of time. Then, the output of NAND gate 111 falls to an "L" level and the output of inverter 113 rises to an "H" level, whereby the transmission permitting signal AK10 again rises to "H". As described above, when the transmission permitting signal AK20 applied from the transfer control portion in the succeeding stage is in a permitting state ("H" level), the transmission permitting signal AK10 applied to the preceding stage portion is brought into an inhibitory state ("L" level) in response to the fall of the transmission signal C10 applied from the preceding stage portion, and the transmission signal C20 applied to the transfer control portion in the succeeding stage falls to an "L" level after a predetermined period of time. Data applied to the input terminal of data holding circuit 12 shown in FIG. 1 is latched to be provided from the output terminal, whereby data transmission from data transmission path 10 to data transmission path 20 is performed.

The case where the data transmission path in the succeeding stage is in a busy state will now be described with reference to FIG. 5. In this case, the transmission permitting signal AK20 applied from the transfer control portion in the succeeding stage is at an "L" level. When the transmission signal C10 applied from the preceding stage portion falls to an "L" level, the output of NAND gate 111 attains an "H" level and the output of inverter 113 falls to an "L" level, whereby the transmission permitting signal AK10 provided from the transmission permitting signal output terminal $\overline{Ako}$ falls to an "L" level. When the transmission permitting signal AK20 applied from the transfer control portion in the succeeding stage is at an "L" level (inhibitory state), the output of NAND gate 115 is at an "H" level. Therefore, as far as the transmission permitting signal AK20 is at an "L" level, the transmission signal C20 applied to transfer control portion 21 in the succeeding stage is held to be "H", whereby data is not transmitted from data transmission path 10 to data transmission path 20.

When the transmission permitting signal AK20 applied from the transfer control portion in the succeeding stage rises to an "H" level, the output of NAND gate 115 falls to an "L" level, whereby the transmission signal C20 applied to the transfer control portion in the succeeding stage falls to an "L" level. Data applied to data holding circuit 12 is latched to be provided responsive to the fall of the transmission signal C20. In the transfer control portion in the succeeding stage, the transmission permitting signal AK20 applied to transfer control portion 11 after a predetermined time falls to an "L" level in response to the fall of the transmission signal C20 applied from transfer control portion 11. Responsive to the fall of the transmission permitting signal AK20 applied from the transfer control portion in the succeeding stage, the transmission permitting signal AK10 applied to the preceding stage portion after a predetermined period of time rises to an "H" level.

As described above, when the transmission permitting signal AK20 applied from the transfer control portion in the succeeding stage is in an inhibitory stage ("L" level), the transmission signal C20 applied to the transfer control portion in the succeeding stage does not fall to an "L" level. That is, data is not transmitted from data transmission path 10 to data transmission path 20 when data transmission path 20 in the succeeding stage is in a busy state.

Figure 6:
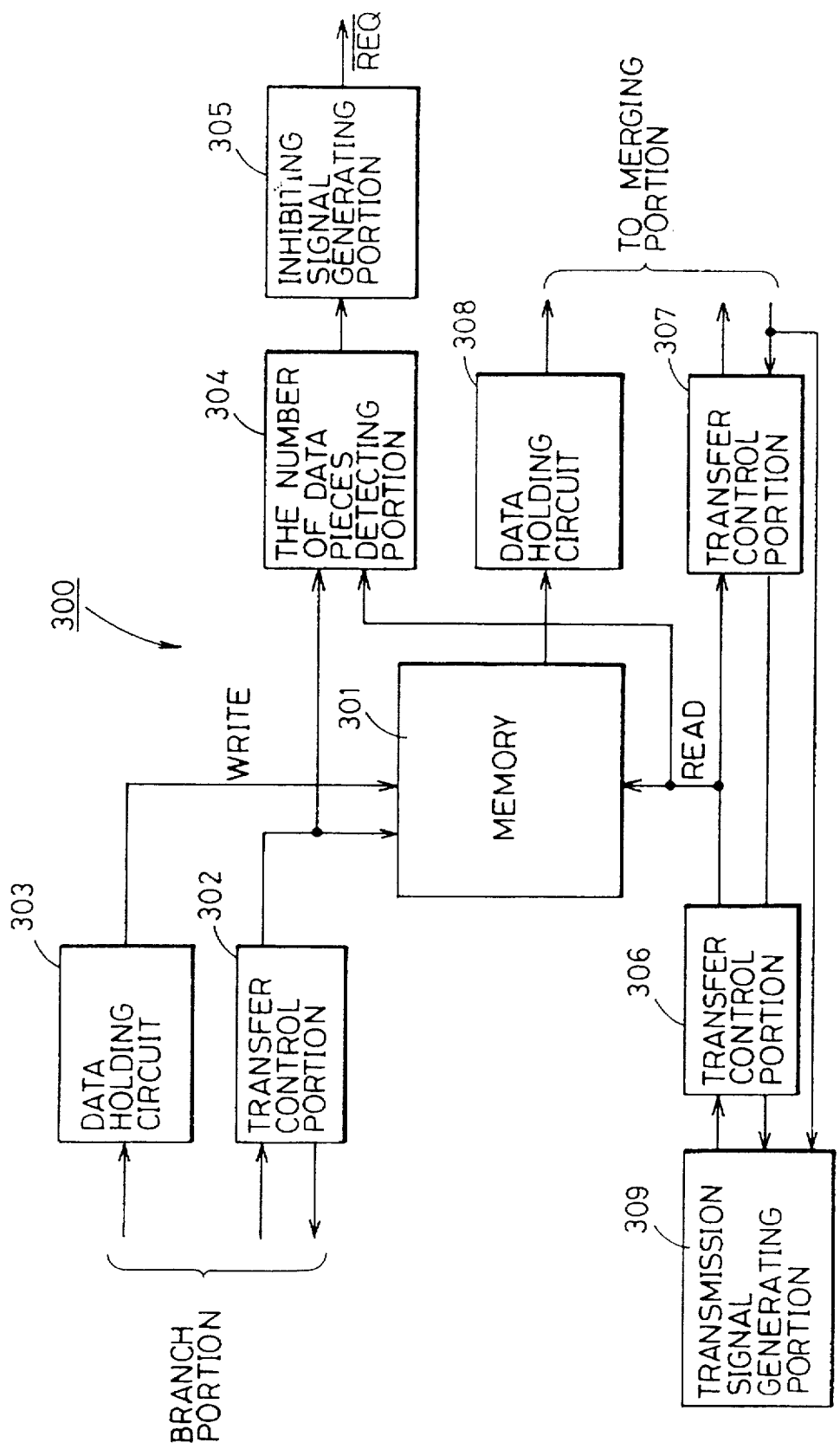
FIG. 6 is a block diagram showing a transmission inhibiting signal generating circuit.
Figure 7:
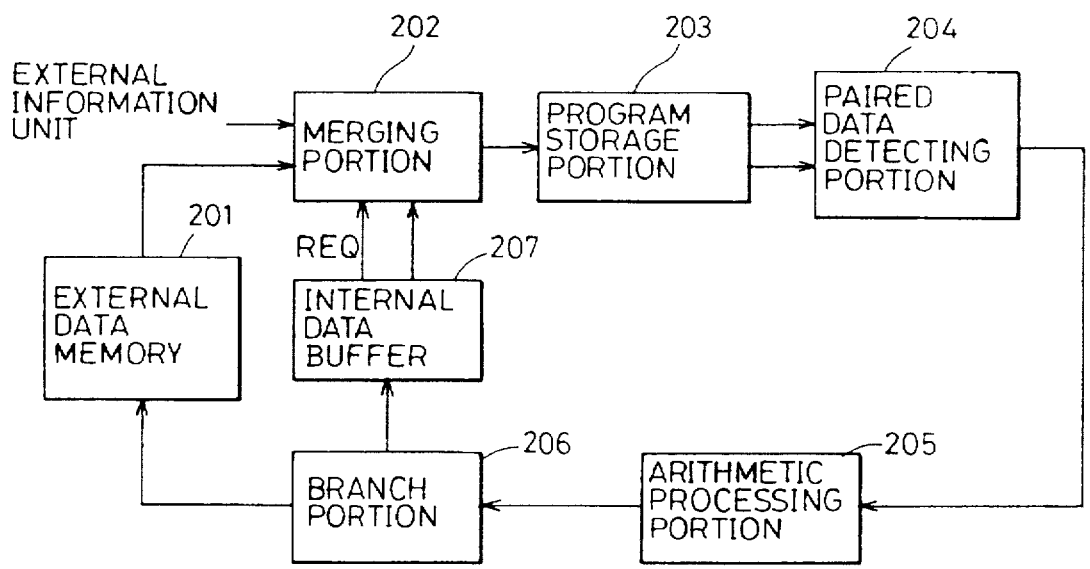
FIG. 7 is a block diagram showing an entire configuration of a data processing apparatus applicable to the present invention.

FIG. 6 is a block diagram of a transmission inhibiting signal generating circuit, and FIG. 7 is a block diagram showing a data flow type information processing apparatus according to one embodiment of the present invention.

Referring to FIG. 7, at first, data from an external data memory 201 is applied to a merging portion 202, and then data from external data memory 201 and data from the external information processing unit are merged at merging portion 202. Merging portion 202, a program storage portion 203, a paired data detecting portion 204, an arithmetic processing circuit 205, a branch portion 206 and an internal data buffer 207 are connected in the form of ring. Program storage portion 203 stores a plurality of programs in advance and, in case of the application of data from merging portion 202, reads out the corresponding program to provide it to paired data detecting portion 204. Paired data detecting portion 204 detects paired data to apply detected paired data to arithmetic processing portion 205 for arithmetic processing. Data of arithmetic result from arithmetic processing portion 205 is applied to branch portion 206, and branched to external data memory 201 or internal data buffer 207. Internal data buffer 207 includes a transmission inhibit signal generating circuit 300.

In one embodiment shown in FIG. 7, merging portion 202 constitutes a first unit, and a second unit is constituted by program storage portion 203, paired data detecting portion 204, arithmetic processing portion 205, branch portion 206 and internal data buffer 207, wherein system down-time is prevented by preventing externally applied data from being merged at merging portion 202 when internal data overflows.

The transmission inhibiting signal generating circuit will be described with reference to FIG. 6. A memory 301 including FIFO memory sequentially writes data when the data transmission path is busy due to the increase in packets of data applied through a data holding circuit 303 from branch portion 206 shown in FIG. 7, and reads out the written data and provides it to merging portion 202 through a data holding circuit 308 when data transmission path is available. The number of data pieces detecting portion 304 detects the number of data pieces written in memory 301 minus the number that is read out from memory 301. That is, the number of data pieces detecting portion 304 includes an up-down counter which counts the value up by 1 at the time of data-writing to memory 301 and counts the value down by 1 at the time of data-reading from memory 301. Accordingly, the number of data pieces detecting portion 304 applies a signal showing an overflow of data to an inhibiting signal generating portion 305 when the count value thereof exceeds the set value. Inhibiting signal generating portion 305 generates a transmission inhibiting signal responsive to the application of the signal from the number of data pieces detecting portion 304. A transmission signal generating portion 309 generates a transmission signal and provides it to merging portion 202 through transfer control portions 306 and 307.

In transmission inhibiting signal generating circuit 300 shown in FIG. 6, the number of data pieces detecting portion 304 counts the value up by 1 each time data is written into memory 301, and counts the value down by 1 each time data is read out from memory 301 to inhibit the generation of the transmission inhibiting signal $\overline{REQ}$ from inhibiting signal generating circuit 305 by determining that the data transmission path is busy if the count value exceeds the set point. When the count value in the number of data pieces detecting portion 304 is less than the set point, the data transmission path is determined to be available, whereby the transmission inhibiting signal $\overline{REQ}$ is released, causing data transfer to be arbitrated by transfer arbitration portion 1 shown in FIG. 1.

As described above, according to the embodiments of the present invention, in the data transmission apparatus transmitting data from the first unit to the second unit, the transmission inhibiting signal is applied to the first unit when the number of data pieces detected in the second unit exceeds the predetermined number, whereby data transmission from the first unit to the second unit is inhibited, preventing the decrease in processing speed of data and overflow thereof.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data driven computer comprising:

merging means for merging externally provided data pieces with internal data pieces of the data driven computer to provide merged data;

processing means, coupled to said merging means, for processing the merged data pieces;

branching means, coupled to said processing means, for branching the processed data pieces to one of first and second data flow paths; and;

data transmission control means, coupled to the first data flow path to receive the processed data pieces, for providing the processed data pieces to said merging means as the internal data pieces, said data transmission control means comprising buffer means for storing the processed data pieces, counter means for counting a net number of processed data pieces stored in said buffer means, comparator means for comparing a count of said counter means with a reference value, and inhibit signal means, coupled to said comparator means, for autonomously generating a transmission inhibit signal in accordance with an output of said comparator, said merging means inhibiting merging of the externally provided data pieces into the merged data in accordance with the transmission inhibit signal.

2. The data driven computer of claim 1, wherein said inhibit signal means autonomously generates the transmission inhibit signal when said comparator means determines that the count is greater than the reference value.

3. The data driven computer of claim 1, wherein said counter means counts the net number of processed data pieces stored in said buffer means by incrementing the count for each processed data piece provided to said buffer means and decrementing the count for each processed data piece provided from said buffer means to said merging means.

4. The data driven computer of claim 1, wherein said buffer means comprises an FIFO memory.

5. A method of merging data asynchronously in a data driven computer, the data driven computer including a merging unit for merging externally provided data pieces with internal data pieces of the data driven computer to provide merged data pieces, a processing unit for processing the merged data, a branching unit for branching the processed data pieces to one of first and second data flow paths, and a data transmission controller for receiving the processed data pieces from the first data flow path and providing the processed data pieces to the merging means as the internal data pieces, the method of merging data comprising:

a) buffering the processed data pieces received by the data transmission controller in a buffer memory;

b) counting a net number of processed data pieces stored in the buffer memory;

c) comparing the net number with a reference value;

d) generating autonomously a transmission inhibit signal according to a result of said step c) of comparing; and e) inhibiting merging of the externally provided data pieces into the merged data pieces in accordance with the transmission inhibit signal.

6. The method of merging data of claim 5, wherein said step d) comprises generating autonomously the transmission inhibit signal when it is determined in said step c) that the net number is greater than the reference value.

7. The method of merging data of claim 5, wherein said step b) comprises incrementing the net number each time a processed data piece received by the data transmission controller is stored in the buffer memory and decrementing the net number each time a processed data piece is provided from the buffer memory to the merging means.

8. The method of merging data of claim 5, wherein said step a) comprises buffering the processed data pieces in an FIFO memory.

9. A data driven computer comprising:

merging means for merging externally applied data pieces with internal data pieces of the data driven computer and providing merged data pieces;

processing means, coupled to said merging means, for processing the merged data pieces;

branching means, coupled to said processing means, for branching the processed data pieces to one of first and second data flow paths, said merging means, said processing means and said branching means being connected in an asynchronous data-driven-architecture ring over which data pieces flow asynchronously;

storage means, coupled to said branching means, for storing the processed data pieces provided along the first data flow path;

detecting means, responsive to a number of processed data pieces written in said storage means and a number of processed data pieces read out from said storage means to said merging means as the internal data pieces, for detecting a number of processed data pieces stored in said storage means exceeding a predetermined number; and transmission inhibiting signal generating means, responsive to said detecting means, for providing autonomously a transmission inhibiting signal to said merging means in accordance with the detected number of processed data pieces, said merging means inhibiting merging of the externally provided data pieces into the merged data pieces in response to receipt of the transmission inhibiting signal.

10. The data driven computer of claim 9, wherein said storage means comprises an FIFO memory which buffers the processed data pieces.

* * * * *